United States Patent
Becerra Becerra et al.

(10) Patent No.: US 9,865,997 B2
(45) Date of Patent: Jan. 9, 2018

(54) DOUBLE SHUTTER SHROUD AND TUNNEL FOR MCC BUS CONNECTIONS

(71) Applicant: SCHNEIDER ELECTRIC USA, INC., Schaumburg, IL (US)

(72) Inventors: Manuel Antonio Becerra Becerra, Apodaca (MX); Arturo Javier Cordova Urbiola, Monterrey (MX); Victor Daniel Espinosa Gutierrez, San Nicolas de los Garza (MX)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/032,669

(22) PCT Filed: Nov. 12, 2013

(86) PCT No.: PCT/US2013/069589
§ 371 (c)(1),
(2) Date: Apr. 28, 2016

(87) PCT Pub. No.: WO2015/072963
PCT Pub. Date: May 21, 2015

(65) Prior Publication Data
US 2016/0322790 A1    Nov. 3, 2016

(51) Int. Cl.
*H02B 1/21* (2006.01)
*H02B 11/24* (2006.01)
(Continued)

(52) U.S. Cl.
CPC .............. *H02B 11/24* (2013.01); *H02B 1/14* (2013.01); *H02B 1/21* (2013.01); *H02B 1/36* (2013.01)

(58) Field of Classification Search
CPC .................................. H02B 1/14; H02B 11/24
See application file for complete search history.

(56) References Cited

U.S. PATENT DOCUMENTS

| 3,121,144 A | 8/1960 | Tjebben |
| 3,142,003 A | 7/1964 | Olashaw |

(Continued)

FOREIGN PATENT DOCUMENTS

| EP | 2110826 A1 | 3/2009 |
| WO | 2011000838 A1 | 1/2011 |

(Continued)

OTHER PUBLICATIONS

International Search Report and Written Opinion dated Mar. 28, 2014 in PCT/US2013/069589, 14 pp.

(Continued)

*Primary Examiner* — Robert J Hoffberg
(74) *Attorney, Agent, or Firm* — Locke Lord LLP

(57) ABSTRACT

A double shutter shroud (5) and a flexible sheath (11) surrounding a stab (10) of an MCC unit, form a protective tunnel (30) for the stab to connect to a bus 4. A first shroud (6) mounted on the bus, includes a first gate (12). A second shroud (20) mounted on the MCC unit includes a second gate (24). When the MCC unit slides into an MCC section, a unit key (16) opens the first gate. When the stab is advanced toward the bus, a stab key (28) opens the second gate, forming a protective tunnel (30) from the flexible sheath and through the first and second shrouds. The protective tunnel protects the stab and bus from contamination, helps prevent dielectric breakdowns and short circuits between different phase busses, and protects an operator from electrical hazard of touching the bus or stab with tools or fingers.

17 Claims, 10 Drawing Sheets

(51) Int. Cl.
*H02B 1/14* (2006.01)
*H02B 1/36* (2006.01)

(56) References Cited

U.S. PATENT DOCUMENTS

| | | | |
|---|---|---|---|
| 3,610,850 A | 10/1971 | Eichelberger | |
| 3,626,253 A | 12/1971 | Sturdivan | |
| 4,033,660 A | 7/1977 | Ericson et al. | |
| 4,139,748 A | 2/1979 | Wolfe et al. | |
| 4,214,291 A | 7/1980 | Koshman et al. | |
| 4,536,822 A | 8/1985 | Osborne | |
| 4,768,967 A | 9/1988 | Fritsch | |
| 4,789,919 A | 12/1988 | Cox et al. | |
| 5,486,663 A | 1/1996 | Fritsch et al. | |
| 5,510,960 A | 4/1996 | Rosen | |
| 6,337,449 B1 | 1/2002 | Brouillat et al. | |
| 6,472,971 B2 | 10/2002 | Toyama et al. | |
| 6,486,421 B1 | 11/2002 | Jones et al. | |
| 6,677,532 B2 | 1/2004 | White et al. | |
| 6,954,060 B1 | 10/2005 | Edel | |
| 7,057,898 B2 | 6/2006 | Chen et al. | |
| 7,688,572 B2 | 3/2010 | Yee et al. | |
| 7,795,551 B2 * | 9/2010 | Narayanan | H01H 1/42 200/255 |
| 8,199,022 B2 | 6/2012 | Morris et al. | |
| 8,305,739 B2 | 6/2012 | Dozier | |
| 8,331,081 B2 * | 12/2012 | Abrahamsen | H02B 11/24 200/50.21 |
| 8,333,600 B2 * | 12/2012 | Yanniello | H02B 11/24 439/138 |
| 8,414,051 B2 | 4/2013 | Nakayoshi | |
| 8,476,992 B2 | 7/2013 | Yang et al. | |
| 8,514,551 B2 | 8/2013 | Cosley | |
| 9,123,488 B2 * | 9/2015 | Seo | H01H 33/48 |
| 9,312,668 B2 * | 4/2016 | Faber | H01H 9/22 |
| 9,748,024 B2 * | 8/2017 | Romero Legorreta | H01B 17/42 |
| 2005/0258922 A1 | 11/2005 | Rowe et al. | |
| 2008/0079436 A1 | 4/2008 | Gollhardt et al. | |
| 2008/0258667 A1 | 10/2008 | Morris et al. | |
| 2009/0000926 A1 | 1/2009 | Buxton et al. | |
| 2010/0024191 A1 | 2/2010 | Ledbetter | |
| 2010/0084920 A1 | 4/2010 | Banting | |
| 2010/0118473 A1 | 5/2010 | Morris et al. | |
| 2010/0280775 A1 | 11/2010 | Schafer et al. | |
| 2011/0110049 A1 | 5/2011 | Lehtola et al. | |
| 2011/0149480 A1 | 6/2011 | Leeman et al. | |
| 2011/0252845 A1 | 10/2011 | Webb et al. | |
| 2011/0285483 A1 | 11/2011 | Morris et al. | |
| 2011/0299228 A1 | 12/2011 | Milovac et al. | |
| 2012/0039061 A1 | 2/2012 | McBee et al. | |
| 2012/0064746 A1 | 3/2012 | Bellows et al. | |
| 2012/0127636 A1 | 5/2012 | Abrahamsen et al. | |
| 2012/0228097 A1 | 9/2012 | Gemme et al. | |
| 2013/0088812 A1 | 4/2013 | Yee et al. | |
| 2015/0171605 A1 | 6/2015 | Jo et al. | |
| 2016/0036204 A1 * | 2/2016 | Schroeder | H02B 11/133 200/50.22 |
| 2017/0237239 A1 * | 8/2017 | Romero Legorreta | H02B 1/21 361/624 |

FOREIGN PATENT DOCUMENTS

| | | |
|---|---|---|
| WO | 2013158723 A1 | 10/2013 |
| WO | 2014142875 A1 | 9/2014 |

OTHER PUBLICATIONS

Model 6 Motor Control Center with Altivar AC Drives—Square D Company Brochure, Document No. 8998HO1201, Sep. 2012, 2 pp.
Model 6 Export Motor Control Centers, Instruction Bulletin No. 80446-300-01A, Square D Company, Oct. 2001, 66 pp.

* cited by examiner

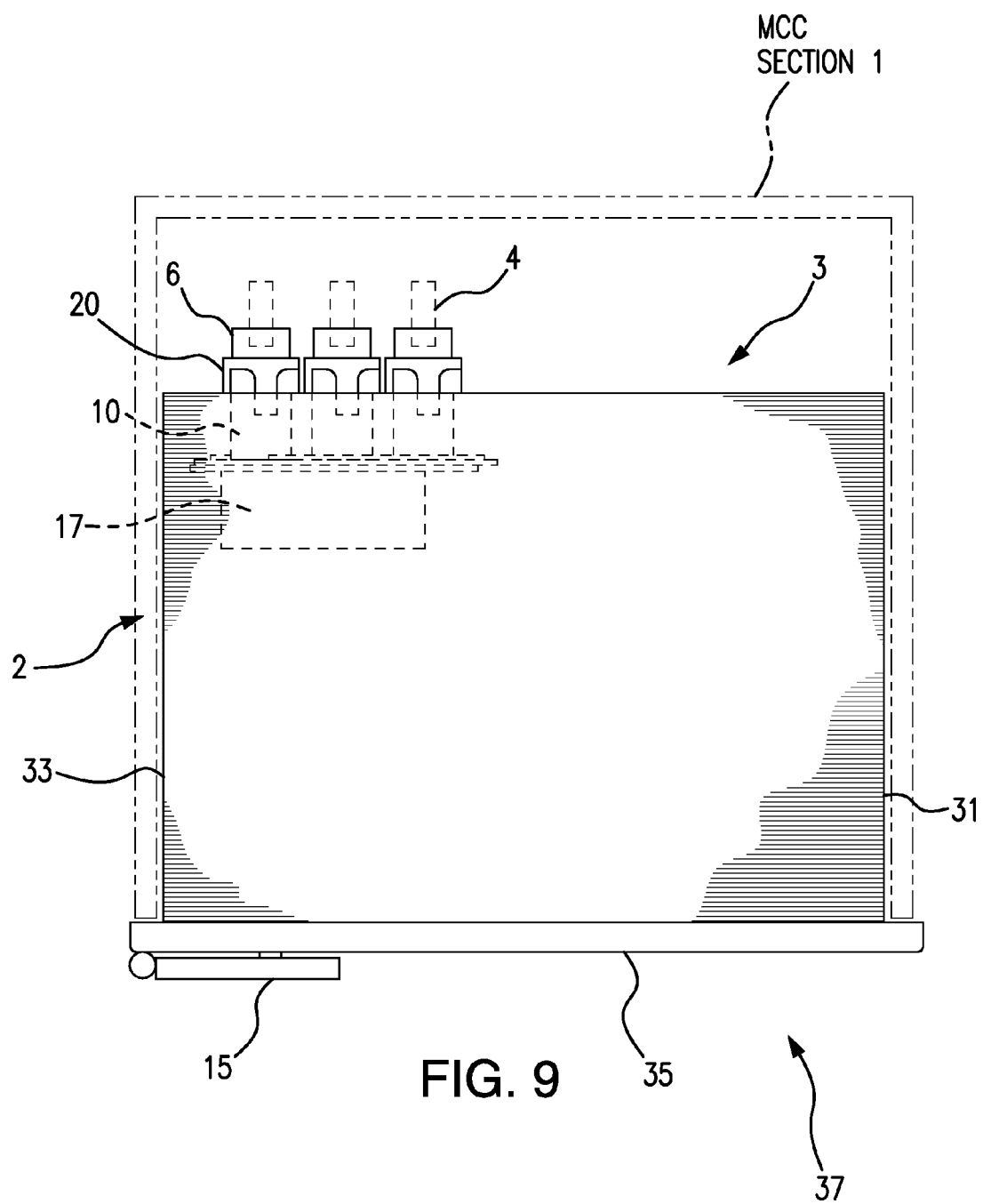

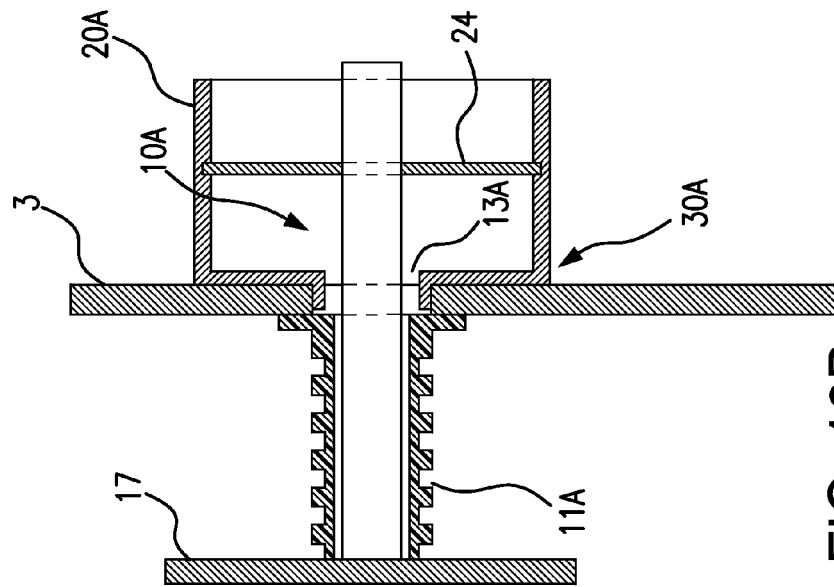
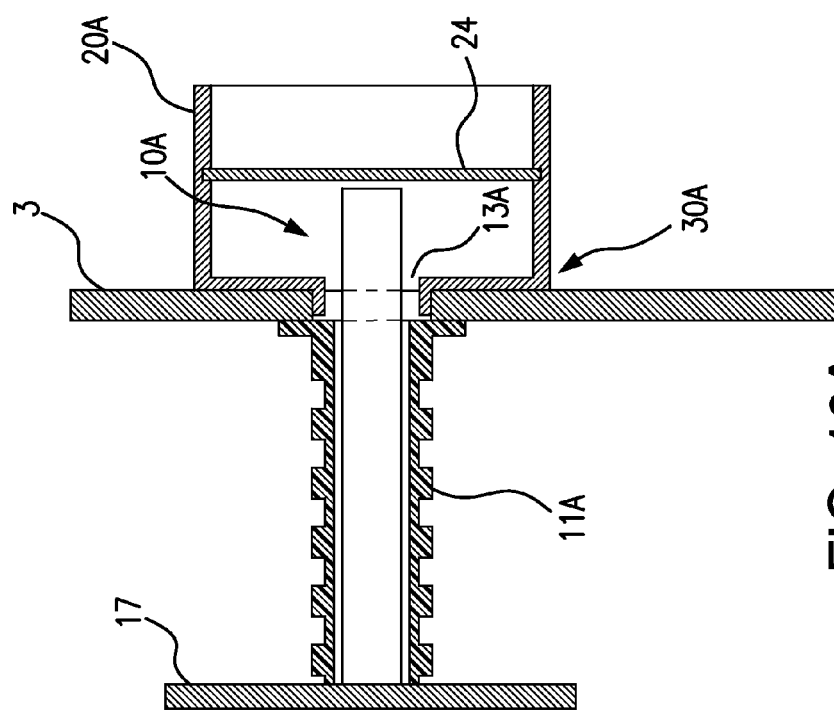
FIG. 10A
FIG. 10B

DOUBLE SHUTTER SHROUD AND TUNNEL FOR MCC BUS CONNECTIONS

FIELD OF THE INVENTION

The invention is generally directed to a bus connection for a motor control center unit.

BACKGROUND OF THE INVENTION

A motor control center, also referred to as an MCC, is generally a cabinet-like structure that is divided into modular sections designed to accept a plurality of component motor control center units, also referred to as MCC units. An MCC "unit" is generally a drawer-like container of electrical components, such as circuit breakers, motor starters, relays, power meters, programmable logic controllers, and other control circuit components used for electrical power distribution in industrial and commercial applications. The MCC unit slides into an MCC section and plugs into a common power bus running vertically along the back side of the MCC section. The MCC unit includes a connector, also referred to as a stab assembly or stabs, arranged at the back side of the unit, to plug into the power bus. The stab assembly is movable within the MCC unit to contact or disconnect from the power busses, for those MCC units that have a closed door operation. When an MCC unit is installed, serviced, or removed from an MCC section, it is of utmost importance to prevent the operator from being exposed to electrical hazards. In existing MCC units, an operator accessible unit on/off handle on the front of the MCC unit enables a circuit breaker within the unit to be switched off before the MCC unit is installed in or removed from the MCC section.

A unit interlock blocks inserting the MCC unit into the motor control center section, without first actuating the connect/disconnect handle for the connect/disconnect mechanism to retract the stabs to prevent contact with a power bus. To insert the MCC unit into the MCC section, the operator slides the MCC unit into an available opening in the section, so that the back wall of the MCC unit is close to the common power bus running along the back side of the section. In a closed door operation, the operator then actuates the connect/disconnect handle for the connect/disconnect mechanism to connect the stabs of the MCC unit to the power bus.

Pollution-induced tracking is a phenomenon that gradually produces a conducting path on the surface of materials as a result of surface wetting and contamination. Contamination of electrical contacts may cause tracking and tracking may lead to arcing. When inserting or removing an MCC unit in an MCC section, it is desirable that the contact area with the bus, in and around the stab, is clean and free of localized surface contamination, to minimize arcing. Industrial environments are typically exposed to pollution such as dust, salt, humidity, and atmospheric chemical agents. The pollution-induced tracking phenomenon may contribute to arc flashes in the air gap between the conductors, when advancing the stabs to or retracting the stabs from the power bus.

SUMMARY OF THE INVENTION

In accordance with an example embodiment of the invention, a double shutter shroud and a flexible, insulating sheath surrounding the stab, form a protective tunnel for the stab to connect to the bus. The double shutter shroud and flexible sheath minimize pollution-induced tracking near the contact area of the stab with the bus. The double shutter shroud and flexible sheath prevent inadvertently creating a short circuit between different bus phases, such as by a misplaced tool touching adjacent buses or stabs. The double shutter shroud and flexible sheath protect an operator from the hazard of inadvertently touching the power bus or stab with tools or fingers. The double shutter shroud and flexible sheath surrounding the stab, together, form a protective tunnel protecting the operator from electrical hazard, protecting the stab and its insulation from contamination by ambient pollution, and provides phase separation protecting adjacent phase busses from shorting. In this manner, operator safety is significantly enhanced when advancing the stabs to or retracting the stabs from the power bus.

The double shutter shroud comprises a first shroud mounted on the power bus located at the rear of the motor control center section. The first shroud is an insulator that surrounds a first access way for receiving the stab of the motor control center unit.

The double shutter shroud further comprises a first gate slideably mounted on the first shroud. The first gate is biased to a closed position that blocks the first access way from receiving the stab of the motor control center unit. The first gate has a slot therein for receiving the insertion of a unit key mounted on the motor control center unit. The insertion of the unit key into the slot of the first gate causes a lock snap to release the first gate and the first gate to slide into an open position to receive the stab, when the motor control center unit is inserted into the motor control center section The first shroud and first gate may be composed of an insulator material, such as an organic polymer plastic or a silicone polymer plastic.

The double shutter shroud further comprises a second shroud mounted on the outward-facing back wall of the motor control center unit. The second shroud is aligned with an aperture in the back wall of the motor control center unit where the stab passes through on its way to contact the bus. The second shroud is aligned with the first shroud. The second shroud is an insulator that surrounds a second access way for passing the stab from the aperture in the back wall of the motor control center unit, toward the power bus. The first shroud is shaped to engage and overlap the second shroud to ensure isolation.

The double shutter shroud further comprises a second gate slideably mounted on the second shroud. The second gate is biased to a closed position that blocks the second access way from passing the stab of the motor control center unit toward the power bus. The second gate has a slot therein for receiving the insertion of a stab key mounted on the stab. The insertion of the stab key into the slot of the second gate causes the second gate to slide into an open position to allow passage of the stab when the stab is advanced toward the power bus. The access way of the first shroud and the access way of the second shroud form a first portion of the protective tunnel for passage of the stab, when the first gate and the second gate are open. The second shroud and second gate may be composed of an insulator material, such as an organic polymer plastic, a silicone polymer plastic, a ceramic material, or glass.

A flexible, insulating sheath located within the motor control center unit, surrounds and protects the stab. The flexible, insulating sheath has one end fastened to the inward-facing back wall of the motor control center unit. The flexible, insulating sheath is aligned with the aperture in the back wall of the motor control center unit where the stab passes through on its way to contact the bus. The flexible, insulating sheath forms the second portion of the protective tunnel with the first and second shrouds. The protective tunnel formed by combination of the double shutter shroud and the flexible sheath surrounding the stab, protects the stab from contamination, helps prevent a short circuit between different phase busses, and protects an operator from electrical hazard of touching the bus or stab with tools or fingers.

The shrouds are coupled and are overlapped before electrical connection is made between the stab and the bus, so that a clear path is provided for the stab to travel from a retracted or disconnected position to an advanced or connected position. The protective tunnel prevents misplaced tools or other conductive material from falling into the pathway of the stab, which could otherwise be pushed by the stab toward the bus as it travels, causing an arc flash.

BRIEF DESCRIPTION OF THE DRAWINGS

Example embodiments of the invention are depicted in the accompanying drawings that are briefly described as follows:

FIG. 9 is a top view of the MCC unit, illustrating the stabs projecting through the protective tunnel formed by the first and second shrouds, with their respective gates open, and in position to contact the bus.

FIGS. 10A and 10B are side views of the flexible, insulating sheath surrounding the stab, having one end fastened to the inward-facing back wall of the motor control center unit and the other end fastened to the stab holder. FIG. 10A shows the stab retracted and the second gate closed. FIG. 10B shows the stab advanced and the second gate open.

DETAILED DESCRIPTION OF THE EXAMPLE EMBODIMENTS

Figure 1:
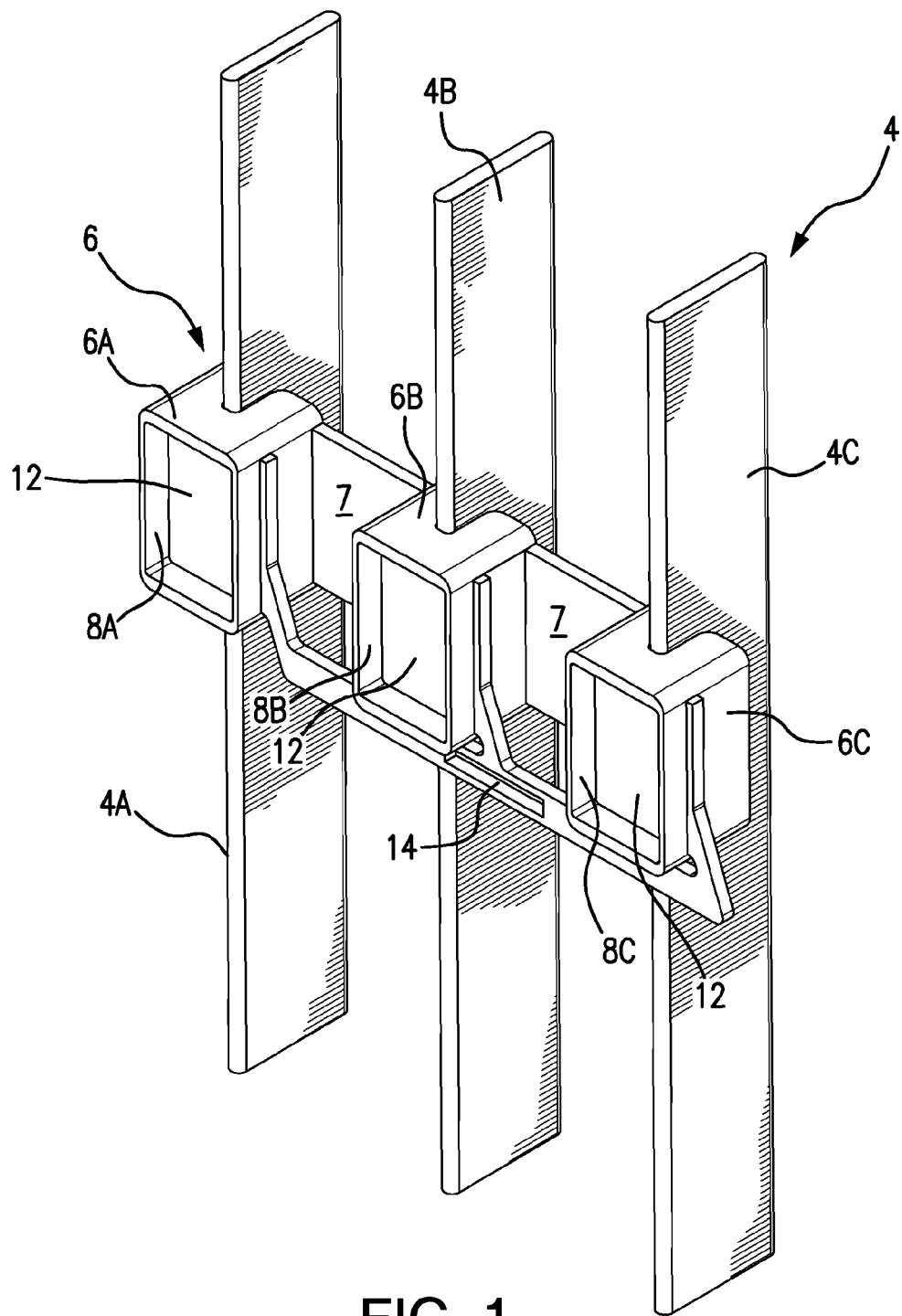
FIG. 1 is a perspective view from the top right side of the first shroud of the double shutter shroud, mounted on the power bus, illustrating the first access way and first gate.

FIG. 1 is a perspective view from the top right side of a common power bus 4 running vertically along the back side of an MCC section. The power bus 4 is shown composed of three bus bars 4A, 4B, 4C, composed of copper or aluminum. The power bus 4 may be a single phase bus with two bus bars 4A and 4C carrying the single phase and one bus bar 4B being grounded. Alternately, the power bus 4 may be a three phase bus with the three bus bars 4A, 4B, 4C each carrying a different one of the three phases. There would be a significant hazard of arcing if a dielectric breakdown or short circuit were to occur between different bus bars 4A, 4B, 4C or stabs, such as by a misplaced tool touching adjacent buses or stabs. And, there would be a severe personal injury hazard to an operator by inadvertently touching a bus bar 4 or stab with tools or fingers.

Other phase and grounding arrangements, as well as bus bar numbers and lay outs, may exist and be accommodated by the present invention.

In accordance with an example embodiment of the invention, arcing and personal injury hazards are mitigated by the double shutter shroud and flexible, insulating sheath surrounding a stab, which form a protective tunnel for the stab to connect to the bus bar 4A, 4B, 4C. The tunnel protects the stabs during their transition or travel from a retracted to an extended position, to avoid getting in contact with loose conductive materials, to prevent arc flash events. With the insulating shrouds coupled and overlapped prior to the electrical connection of the stabs to the bus, the invention prevents the movable stabs from dragging or pushing a foreign conductive material towards the power bus, which could cause an arc flash. The double shutter shroud and flexible sheath comprise a connective member between the stab of the MCC unit and the power bus. The figure shows the first shroud 6 of the double shutter shroud, mounted on the bus 4. The first shroud 6 may comprise multiple shroud units, 6A, 6B, and 6C, each shroud unit being fastened to a respective bus bar 4A, 4B, 4C. Each shroud unit 6A, 6B, and 6C may be fastened to its respective bus bar 4A, 4B, 4C by means of a suitable adhesive. Attachment of the first shroud 6 to the bus 4 may be done, for example, at the time of initial installation of the MCC unit 2 in the MCC section or at a later time. The first shroud units 6A, 6B, and 6C may be provided in a retrofit kit for easy retrofitting on the respective bus bars 4A, 4B, 4C in the MCC section.

Each first shroud unit 6A, 6B, and 6C of the first shroud 6, surrounds a respective first access way 8A, 8B, and 8C, for receiving a respective stab of the motor control center unit. The figure shows a first gate 12 that is slideably mounted on the first shroud 6. The first gate 12 is biased to a closed position, as shown in the figure, which blocks each respective first access way 8A, 8B, and 8C from receiving the respective stab of the motor control center unit. The first gate 12 may be biased to a closed position by means of a spring, such as a non-conductive plastic spring, either a compression or tension spring, located between the gate 12 and the first shroud 6. The first gate 12 has a slot 14 therein for receiving the insertion of a unit key mounted on the motor control center unit. The insertion of the unit key into the slot 14 of the first gate 12 causes the lock snap 21 to release and the first gate to slide into an open position to receive the stabs, when the motor control center unit is inserted into the motor control center section The first shroud 6 and first gate 12 may be composed of an insulator material, for example an insulating material consisting of organic polymers, organic polymers filled with a tracking resistant material, silicone polymers, silicone polymers filled with a tracking resistant material, a ceramic material, or glass. In an example embodiment of the invention, the three first shroud units 6A, 6B, and 6C may be joined by an insulating web 7 to form the unitary first shroud 6 shown in the figure.

Figure 2:
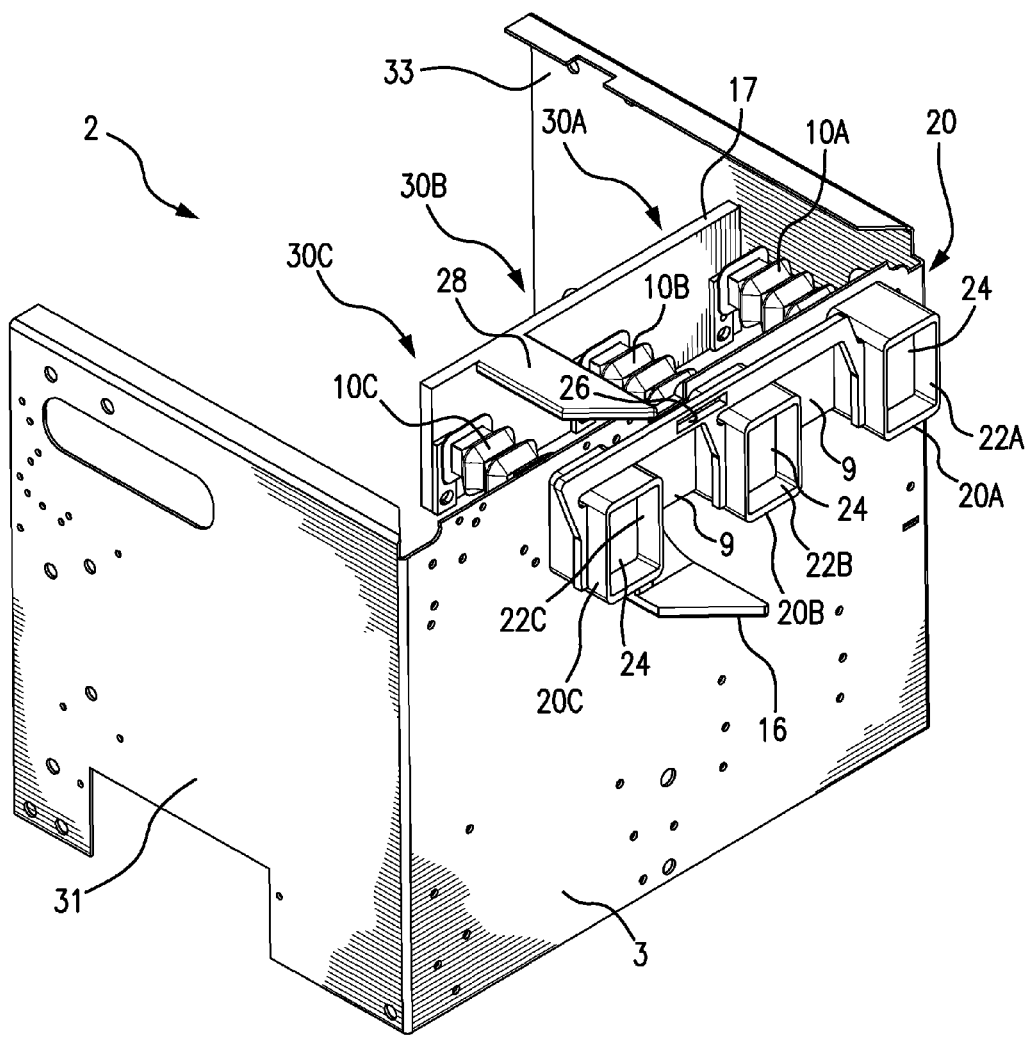
FIG. 2 is a perspective view from the top left side of the back wall of MCC unit, illustrating the second shroud of the double shutter shroud, the second access way and second gate, mounted on the back wall of the MCC unit.

FIG. 2 is a perspective view from the top left side of the back wall 3 of the MCC unit 2. The MCC unit 2 is a housing configured to be inserted into a motor control center section. The MCC unit 2 housing includes an outer structure comprising a back wall 3, side walls 31 and 33, and a front door hinged to one of the side walls 33 configured to open a front side of the housing to provide access to an interior space. The back wall of the housing is configured to be located adjacent to an electrical power bus when the housing has been inserted into the motor control center section 1. The figure illustrates the second shroud 20 of the double shutter shroud. The second shroud 20 may comprise multiple shroud units, 20A, 20B, and 20C mounted on the outward-facing back wall 3 of the motor control center unit 2. Each of the second shroud units 20A, 20B, and 20C is aligned with a respective aperture in the back wall 3 of the motor control center unit 2 where the respective stab 10A, 10B, and 10C passes through on its way to contact the respective bus bar 4A, 4B, 4C. Each of the second shroud units 20A, 20B, and 20C is aligned with the respective first shroud unit 6A, 6B, and 6C. Each of the second shroud units 20A, 20B, and 20C surrounds a respective second access way 22A, 22B, and 22C for passing the respective stab 10A, 10B, and 10C from the respective aperture in the back wall 3 of the motor control center unit 2, toward the respective bus bar 4A, 4B, 4C. Each of the second shroud units 20A, 20B, and 20C may be fastened on the outward-facing back wall 3 of the MCC unit 2, by means of a suitable adhesive. Attachment of the second shroud units 20A, 20B, and 20C to the MCC unit 2 may be done, for example, at the time of manufacture of the MCC unit 2, at the time of installation of the MCC unit in the MCC section, or at a later time. The second shroud units 20A, 20B, and 20C may be provided in a retrofit kit for easy retrofitting on the MCC unit 2. Each first shroud unit 6A, 6B, and 6C is shaped to engage and overlap the respective second shroud unit 20A, 20B, and 20C.

The figure shows the second gate 24 slideably mounted on the second shroud 20. The second gate 24 is biased to a closed position that blocks each second access way 22A, 22B, and 22C from passing the respective stab 10A, 10B, and 10C of the motor control center unit toward the respective bus bar 4A, 4B, 4C. The second gate 24 may be biased to a closed position by means of a spring, such as a non-conductive plastic spring, either a compression or tension spring, located between the gate 24 and the second shroud 20. The second gate 24 has a slot 26 therein for receiving the insertion of a stab key 28 mounted on the stab holder 17 in association with the stabs. The insertion of the stab key 28 into the slot 26 of the second gate 24 causes the second gate 24 to slide into an open position to allow passage of the stabs 10A, 10B, and 10C when the stabs are advanced toward the bus 4. Each first access way 8A, 8B, and 8C of the first shroud 6 and each respective second access way 22A, 22B, and 22C of the second shroud 20 form a first portion of a respective protective tunnel 30A, 30B, and 30C for passage of the respective stabs 10A, 10B, and 10C, when the first gate 12 and the second gate 24 are open. The second shroud 20 and second gate 24 may be composed of an insulator material, for example an insulating material consisting of organic polymers, organic polymers filled with a tracking resistant material, silicone polymers, silicone polymers filled with a tracking resistant material, a ceramic material, or glass. In an example embodiment of the invention, the three second shroud units 20A, 20B, and 20C may be joined by an insulating web 9 to form the unitary second shroud 20 shown in the figure.

Figure 3:
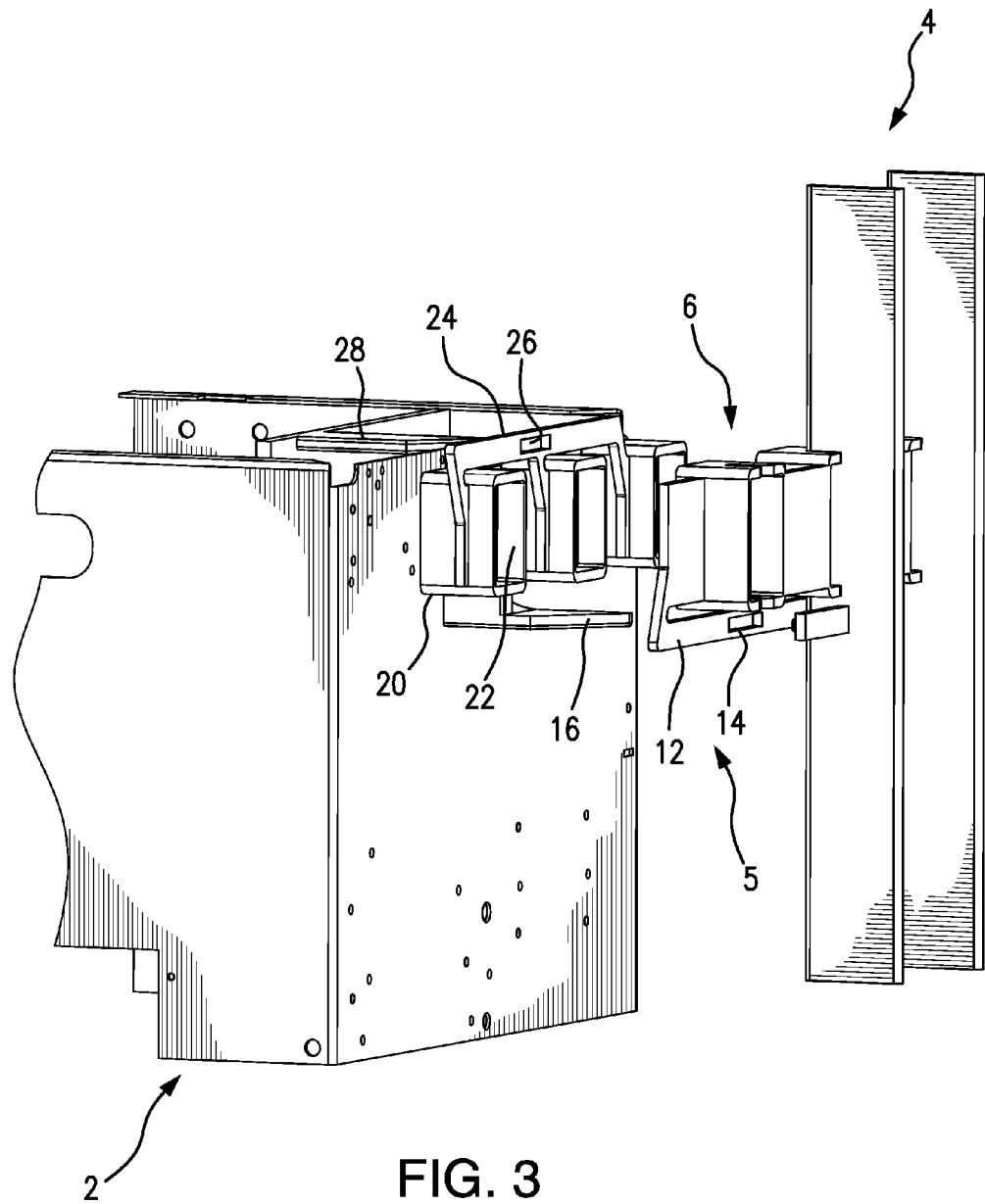
FIG. 3 is a side view of the first and second shrouds, illustrating the unit key on the MCC unit being aligned with the slot in the first gate of the first shroud at the bus, of the double shutter shroud.

FIG. 3 is a side view of the first shroud 6 and second shroud 20, before the MCC unit 2 has been fully inserted into the MCC section. The Figure shows the unit key 16 on the MCC unit 2 being aligned with the slot 14 in the first gate 12 of the first shroud 6 at the bus bar 4, of the double shutter shroud 5. The insertion of the unit key 16 into the slot 14 of the first gate 12 will cause the lock snap to release and the first gate 12 to slide into an open position to receive the stabs 10A, 10B, and 10C, when the motor control center unit 2 is inserted into the motor control center section.

Figure 4:
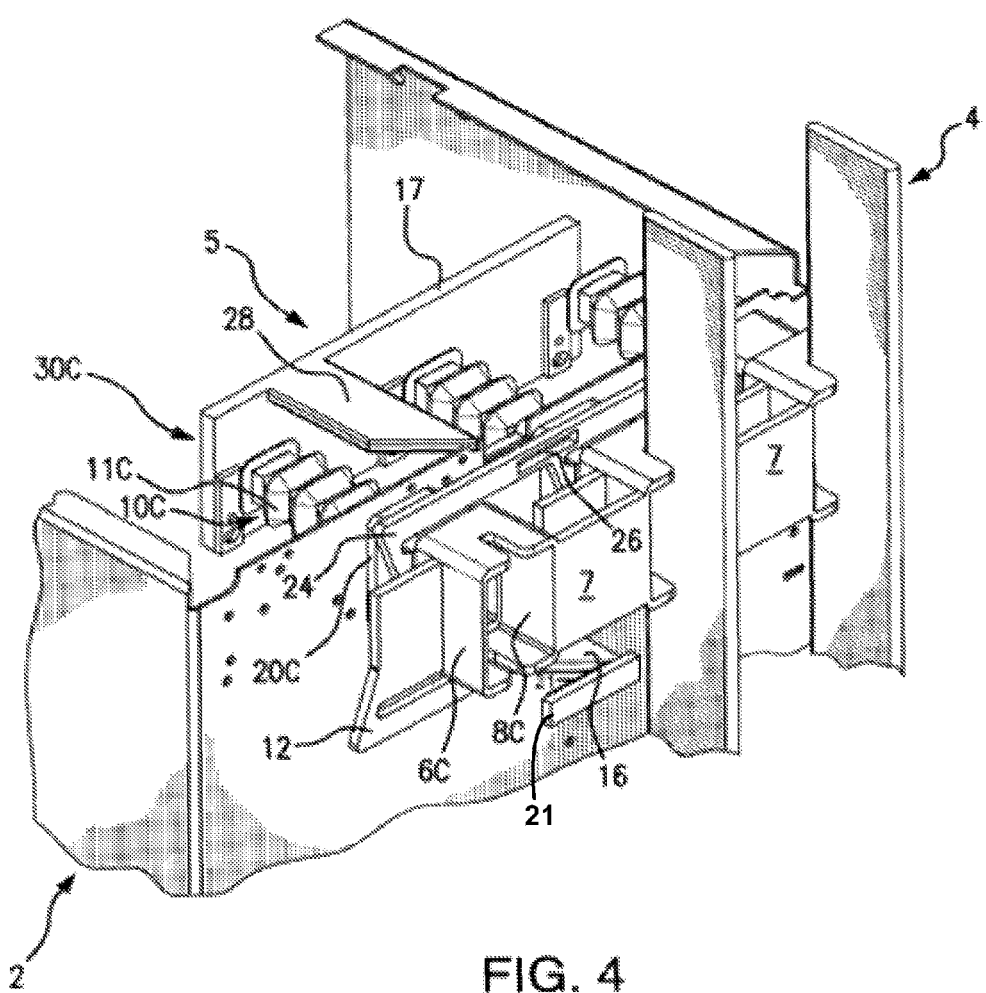
FIG. 4 is a perspective view from the top left side of the rear of the MCC unit, illustrating the first shroud, first gate, and first access way at the bus, and further illustrating the stab key aligned with the slot in the second gate at the MCC unit, of the double shutter shroud.

FIG. 4 is a perspective view from the top left side of the rear of MCC unit 2, illustrating the first shroud 6, first gate 12, and first access way 8C at the bus 4. The unit key 16 has been inserted into the slot 14 of the first gate 12 when the MCC unit 2 was fully inserted into the MCC section. The figure further illustrates the stab key 28 aligned with the slot 26 in the second gate 24 at the MCC unit 2. The insertion of the stab key 28 into the slot 26 of the second gate 24 will cause the second gate 24 to slide into an open position to allow passage of the stab 10C when the stab 10C is advanced toward the bus 4. The figure shows the first shroud unit 6C and second shroud unit 20C of the double shutter shroud 5, and the flexible, insulating sheath 11C surrounding the stab 10C, which form the protective tunnel 30C for the stab 10C to connect to the bus 4.

Figure 5:
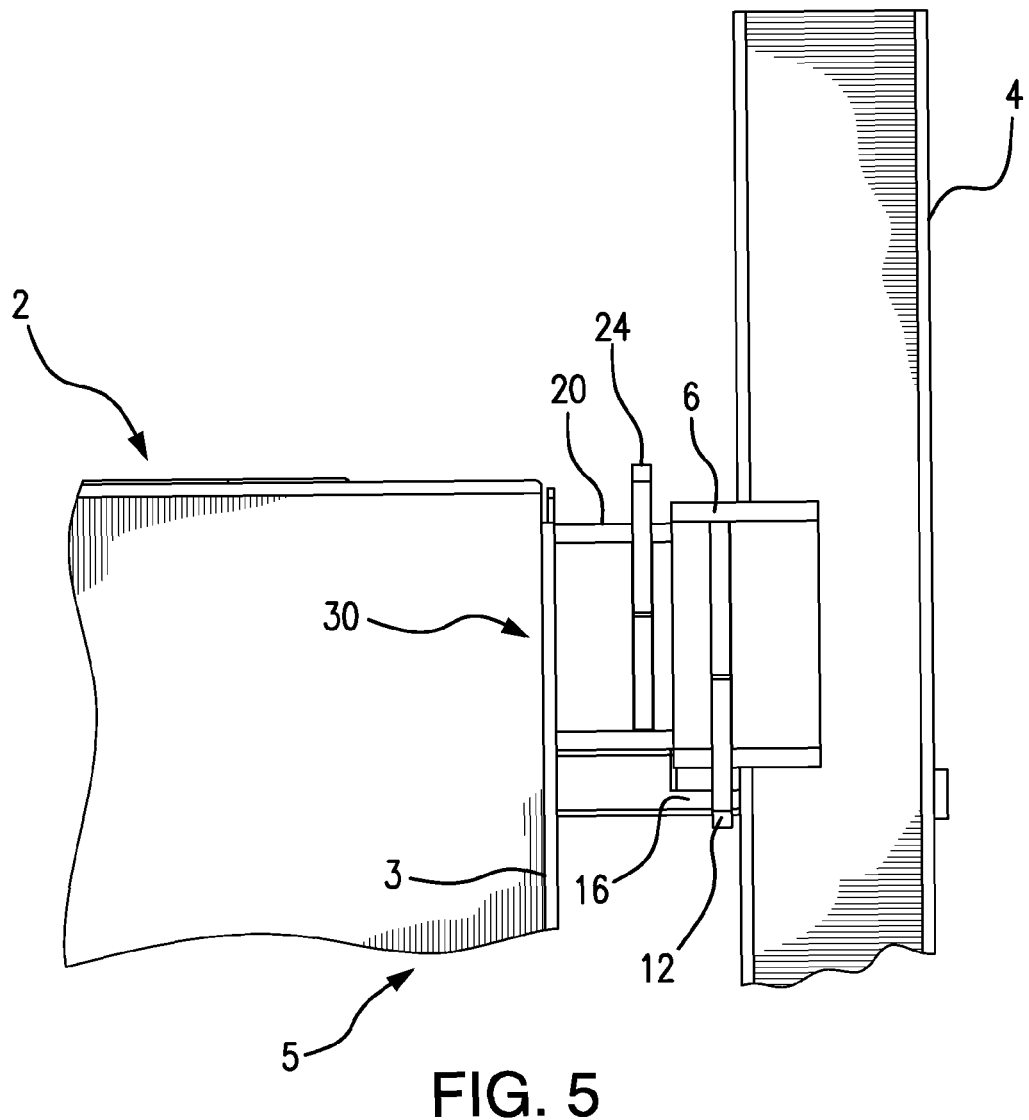
FIG. 5 is a side view of the first and second shrouds, illustrating the unit key at the MCC unit engaged with the first gate of the first shroud at the bus, of the double shutter shroud.

FIG. 5 is a side view of the first shroud 6 overlapping the second shroud 20 after the MCC unit 2 has been fully inserted into the MCC section. The unit key 16 at the MCC unit 2 has engaged and been inserted into the slot 14 of the first gate 12 of the first shroud 6 at the bus 4. The first access way 8A, 8B, and 8C of the first shroud 6 and the respective second access way 22A, 22B, and 22C of the second shroud 20 form a first portion of the respective protective tunnel 30 for passage of the respective stab 10A, 10B, and 10C, when the first gate 12 and the second gate 24 are open. The tunnel protects the stabs from getting in contact with conductive material or another obstacles all along their travel from a retracted position to an advanced position to connect with the power bus. The tunnel creates a clear path within the tunnel, for the passage of stabs on their travel from a retracted to an extended position. The insulating shrouds are coupled and overlapped prior to electrical connection of the stabs to the power bus, so that when the stabs move towards the power bus, falling tools or other loose, conductive materials cannot obstruct the stabs' travel.

Figure 6:
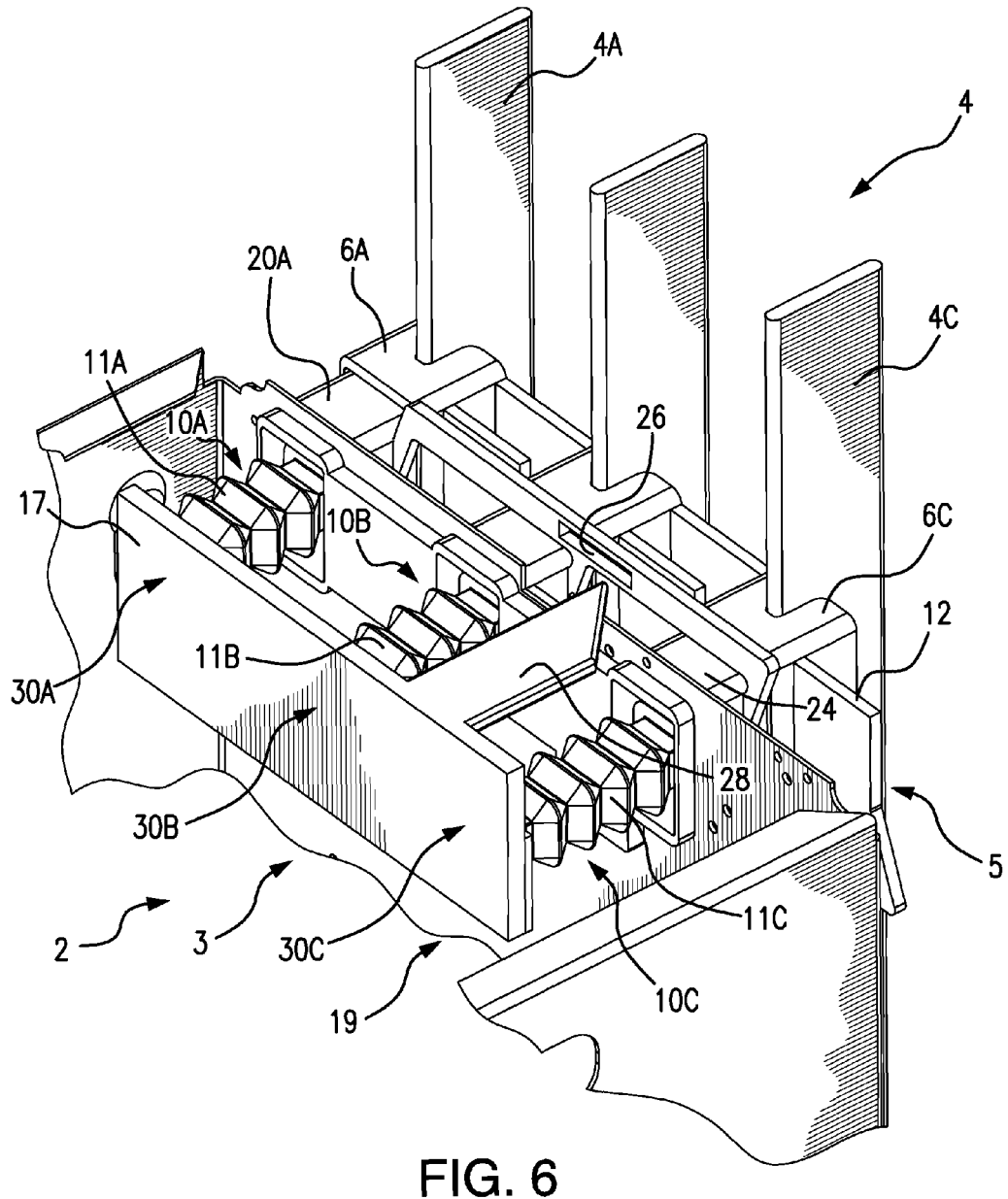
FIG. 6 is a perspective view from the top right side of the front-facing portion of the stab holder within the MCC unit, showing the MCC unit 2 having been fully inserted into the MCC section so that the first gate 12 has been opened. the figure illustrates the portion of the stabs within the MCC unit being encased in a flexible, insulating sheath, the figure further illustrating the stab key being aligned with the slot in the second gate at the MCC unit, of the double shutter shroud.

FIG. 6 is a perspective view from the top right side of the front-facing portion of the stab holder 17 within the MCC unit 2. The figure shows the MCC unit 2 having been fully inserted into the MCC section so that the first gate 12 has been opened. The figure illustrates the portion of the stabs 10A, 10B, and 10C within the MCC unit 2 being encased in the flexible, insulating sheath 11A, 11B, and 11C composed of a flexible insulating material. The flexible, insulating sheath 11A, 11B, and 11C is located within the motor control center unit 2 and surrounds the respective stab 10A, 10B, and 10C. The flexible, insulating sheath 11A, 11B, and 11C has one end fastened to the inward-face 19 of the back wall 3 of the motor control center unit 2 and the other end fastened to the stab holder 17. The flexible, insulating sheath 11A, 11B, and 11C is aligned with a respective aperture in the back wall 3 of the motor control center unit 2 where the respective stab 10A, 10B, and 10C passes through on its way to contact the respective bus bar 4A, 4B, 4C. The flexible, insulating sheath 11A, 11B, and 11C forms the second portion of the respective protective tunnel 30A, 30B, and 30C with the respective first shroud unit 6A, 6B, and 6C and the second shroud unit 20A, 20B, and 20C. The protective tunnel 30A, 30B, and 30C formed by combination of the double shutter shroud 5 and the respective flexible sheath 11A, 11B, and 11C surrounding the respective stabs 10A, 10B, and 10C, protect the stabs from contamination, prevent a dielectric breakdown or short circuit between different phase busses, and protect an operator from electrical hazard of touching the bus or stab with tools or fingers. The figure further illustrates the stab key 28 being aligned with the slot 26 in the second gate 24 at the MCC unit 2. The flexible, insulating sheath 11C is shown in an extended state as the stab holder 17 is at a retracted distance from the back wall 3 of the MCC unit 2. The protective tunnel formed by combination of the double shutter shroud and the flexible sheath surrounding the stab, protects the stab from contamination, prevents a dielectric breakdown or short circuit between different phase busses, and protects an operator from electrical hazard of touching the bus or stab with tools or fingers.

Each flexible sheath 11A, 11B, and 11C may be composed of a flexible insulator material, such as a flexible organic polymer or a flexible silicone polymer. Each flexible sheath 11A, 11B, and 11C may be fastened to the back wall 3 of the MCC unit and to the stab holder 17 by means of a suitable adhesive. Attachment of the flexible sheath 11A, 11B, and 11C may be done, for example, at the time of manufacture of the MCC unit 2, at the time of installation of the MCC unit in the MCC section, or at a later time. The flexible sheath 11A, 11B, and 11C may be provided in a retrofit kit for easy retrofitting on the MCC unit 2. An example retrofit kit would include the first shroud units 6A, 6B, and 6C with the first gates, the second shroud units 20A, 20B, and 20C with the second gates, and the flexible sheaths 11A, 11B, and 11C, for easy retrofitting of the double shutter shroud and flexible sheath.

Figure 7:
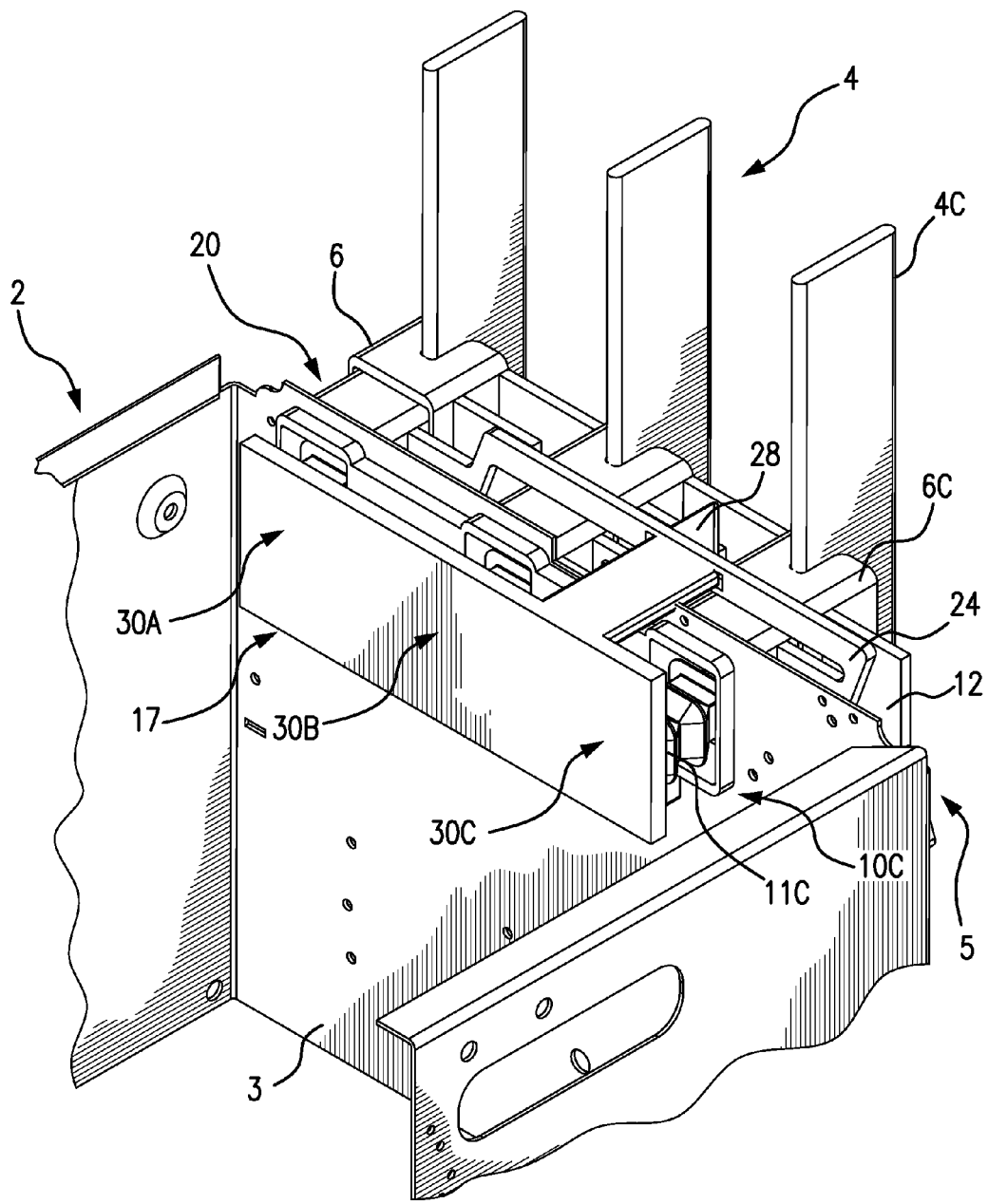
FIG. 7 is a perspective view from the top right side of the front-facing portion of the stab holder within the MCC unit, showing the stabs being advanced to contact the bus, so that the second gate has been opened. The figure illustrates the stab key being engaged with the slot in the second gate at the MCC unit, thereby opening the second gate for the second shroud at the MCC unit, of the double shutter shroud.

FIG. 7 is a perspective view from the top right side of the front-facing portion of the stab holder within the MCC unit. The figure shows the stabs having been advanced to contact the bus 4, so that the second gate 24 has been opened. The figure illustrates the stab key 28 being engaged with the slot 26 in the second gate 24 at the MCC unit 2, thereby opening the second gate 24 for the second shroud 20 at the MCC unit 2, of the double shutter shroud 5. The figure shows the flexible, insulating sheath 11C forming the second portion of the protective tunnel 30C with the first shroud unit 6C and the second shroud unit 20C. The flexible, insulating sheath 11C is shown in a collapsed state as the stab holder 17 has advanced to a closer distance to the back wall 3 of the MCC unit 2.

Figure 8:
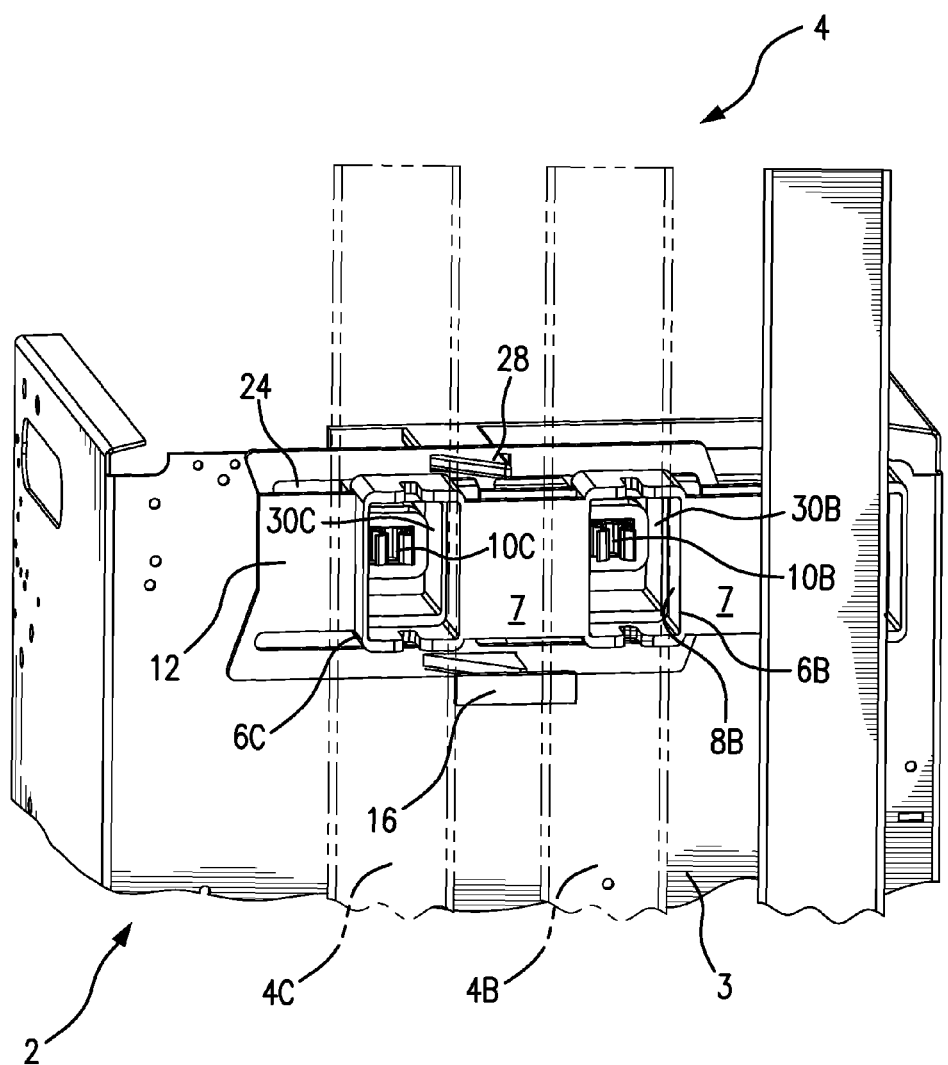
FIG. 8 is a perspective view from the top left side of the rear of the MCC unit, illustrating the stabs projecting through the protective tunnel formed by the first and second shrouds, with their respective gates open, and in position to contact the bus.

FIG. 8 is a perspective view from the top left side of the rear of the MCC unit. The figure illustrates the stabs 10B and 10C projecting through the respective protective tunnels 30B and 30C formed by the first shroud units 6B and 6C and the second shroud 20, with their respective gates open, the stabs 10B and 10C being in position to contact the respective bus bars 4B and 4C.

FIG. 9 is a top view of the MCC unit 2, illustrating the relative position of the stabs 10A, 10B, and 10C with the respective first shroud units 6A, 6B, and 6C and the second shroud units 20A, 20B, and 20C. The flexible sheaths are omitted in this figure to simplify the drawing. The MCC unit 2 is shown inserted into the MCC section 1 (shown with phantom lines), so that the back wall 3 of the MCC unit 2 is positioned adjacent to the bus 4. The connect/disconnect handle 15 is shown having advanced the stab holder 17, which opens the second gate 24 of the second shroud 20, enabling the stabs 10A, 10B, and 10C to contact the bus bars 4A, 4B, and 4C. The figure shows the MCC unit 2 housing configured to be inserted into the motor control center section 1. The MCC unit 2 housing includes an outer structure comprising the back wall 3, side walls 31 and 33, and the front door 35 hinged to one of the side walls 33, configured to open the front side 37 of the housing to provide access to the interior space 39. The back wall 3 of the housing is configured to be located adjacent to the power bus 4 when the housing has been inserted into the motor control center section 1. The stabs 10 are shown electrically connected to electrical components 41 located within the interior space 39 of the housing.

FIGS. 10A and 10B are side views of the flexible, insulating sheath 11A surrounding the stab 10A. The flexible, insulating sheath 11A has one end fastened to the inward-facing back wall 3 of the motor control center unit 2 and aligned with the aperture 13A of the back wall 3. The other end of the flexible, insulating sheath 11A is fastened to the stab holder 17. The flexible, insulating sheath 11A forms the protective tunnel 30A with the second shroud unit 20A, 20B, and 20C and the first shroud 6. FIG. 10A shows the flexible, insulating sheath 11A in an extended state as the stab holder 17 is at a retracted distance from the back wall 3 of the MCC unit 2. The second gate 24 is shown closed. FIG. 10B shows the flexible, insulating sheath 11A is shown in a collapsed state as the stab holder 17 has advanced to a closer distance to the back wall 3 of the MCC unit 2. The second gate 24 is shown open.

Although specific example embodiments of the invention have been disclosed, persons of skill in the art will appreciate that changes may be made to the details described for the specific example embodiments, without departing from the spirit and the scope of the invention.

What is claimed is:

1. A connective member between a stab of a motor control center unit and a power bus, comprising:
   a first shroud mounted on the power bus located at a back side of a motor control center section configured to house the motor control center unit, the first shroud surrounding a first access way for receiving the stab of the motor control center unit;
   a first gate slideably mounted on the first shroud, the first gate being biased to a closed position of the first gate that blocks the first access way from receiving the stab of the motor control center unit, the first gate being configured to slide into an open position of the first gate to receive the stab when the motor control center unit is inserted into the motor control center section;
   a second shroud mounted on a back wall of the motor control center unit, the second shroud being aligned with the first shroud, the second shroud surrounding a second access way for passing the stab of the motor control center unit toward the power bus; and
   a second gate slideably mounted on the second shroud, the second gate being biased to a closed position of the second gate that blocks the second access way from passing the stab of the motor control center unit toward the power bus, the second gate being configured to slide into an open position of the second gate to allow passage of the stab when the stab is advanced toward the power bus, the first access way of the first shroud and the second access way of the second shroud forming a protective tunnel when the first gate and the second gate are open.

2. The connective member between the stab of a motor control center unit and the power bus of claim 1:
wherein the second shroud is aligned with an aperture in the back wall of the motor control center unit, the aperture being where the stab passes through on its way to contact the power bus;
the connective member further comprising: a flexible, insulating sheath located within the motor control center unit, the flexible, insulating sheath surrounding the stab and having one end fastened to an inward-face of the back wall of the motor control center unit, the flexible, insulating sheath being aligned with the aperture in the back wall of the motor control center unit, the flexible, insulating sheath, in combination with the first and second shrouds, forming the protective tunnel.

3. The connective member between the stab of a motor control center unit and the power bus of claim 2:
wherein the protective tunnel is formed by the flexible, insulating sheath, in combination with the first and second shrouds, the protective tunnel configured to protect the stab from contamination, prevent a dielectric breakdown or short circuit between different phase busses, and protect an operator from electrical hazard of touching the bus or the stab with tools or fingers.

4. The connective member between the stab of a motor control center unit and the power bus of claim 1:
wherein the first gate has a slot therein for receiving insertion of a unit key mounted on the motor control center unit, the insertion of the unit key into the slot of the first gate causing the first gate to slide into the open position of the first gate to receive the stab.

5. The connective member between the stab of a motor control center unit and the power bus of claim 4:
wherein the unit key has a surface that engages the slot of the first gate, to push the first gate to slide into the open position of the first gate to receive the stab, when the motor control center unit is inserted into the motor control center section.

6. The connective member between the stab of a motor control center unit and the power bus of claim 1:
wherein the second gate has a slot therein for receiving insertion of a stab key mounted in association with the stab, the insertion of the stab key into the slot of the second gate causing the second gate to slide into the open position of the second gate to allow passage of the stab when the stab is advanced toward the power bus.

7. The connective member between the stab of a motor control center unit and the power bus of claim 6:
wherein the stab key has a surface that engages the slot of the second gate, to push the second gate to slide into the open position of the second gate to allow passage of the stab when the stab is advanced toward the power bus.

8. The connective member between the stab of a motor control center unit and the power bus of claim 1:
wherein the first and second shrouds are composed of an insulating material selected from the group consisting of organic polymers, organic polymers filled with a tracking resistant material, silicone polymers, silicone polymers filled with a tracking resistant material, a ceramic material, and glass.

9. The connective member between the stab of a motor control center unit and the power bus of claim 1:
wherein the first and second shrouds are overlapped before electrical connection of the stab to the power bus.

10. A retrofit kit for a connective member between a stab of a motor control center unit and a power bus, comprising:
a first shroud configured to be mounted on the power bus located at a back side of a motor control center section configured to house the motor control center unit, the first shroud surrounding a first access way for receiving the stab of the motor control center unit;
a first gate slideably mounted on the first shroud, the first gate being biased to a closed position of the first gate configured to block the first access way from receiving the stab of the motor control center unit, the first gate being configured to slide into an open position of the first gate to receive the stab when the motor control center unit is inserted into the motor control center section;
a second shroud configured to be mounted on a back wall of the motor control center unit, the second shroud being aligned with the first shroud, the second shroud surrounding a second access way for passing the stab of the motor control center unit toward the power bus; and
a second gate slideably mounted on the second shroud, the second gate being biased to a closed position of the second gate and configured to block the second access way from passing the stab of the motor control center unit toward the power bus, the second gate being configured to slide into an open position of the second gate to allow passage of the stab when the stab is advanced toward the power bus, the first access way of the first shroud and the second access way of the second shroud forming a protective tunnel when the first gate and the second gate are open.

11. The retrofit kit for a connective member between the stab of a motor control center unit and the power bus of claim 10:
wherein the second shroud is configured to be aligned with an aperture in the back wall of the motor control center unit, the aperture being where the stab passes through on its way to contact the power bus;
the retrofit kit further comprising: a flexible, insulating sheath configured to be located within the motor control center unit, the flexible, insulating sheath configured to surround the stab and have one end fastened to an inward-face of the back wall of the motor control center unit, the flexible, insulating sheath configured to be aligned with the aperture in the back wall of the motor control center unit; the flexible, insulating sheath, in combination with the first and second shrouds, forming the protective tunnel.

12. A motor control center unit, comprising:
a housing configured to be inserted into a motor control center section, the housing including an outer structure comprising side walls, a back wall, and a front door hinged to one of the side walls and configured to open a front side of the housing to provide access to an interior space, the back wall of the housing being configured to be located adjacent to an electrical power bus when the housing has been inserted into the motor control center section;
stabs configured to project through a plurality of apertures in the back wall of the housing, to mechanically and electrically engage the electrical power bus for electrical connection therewith, when pushed in a backward direction toward the electrical power bus, the stabs being electrically connected to electrical components located within the housing;

a connect/disconnect handle located on the front side of the housing, coupled to the stabs, the connect/disconnect handle being configured to push the stabs to connect the stabs to the electrical power bus or pull the stabs to disconnect the stabs from the electrical power bus;

a connective member between the stabs of the motor control center unit and the electrical power bus, comprising:

a first shroud mounted on the electrical power bus, the first shroud surrounding a first access way for receiving a respective one of the stabs of the motor control center unit;

a first gate slideably mounted on the first shroud, the first gate being biased to a closed position of the first gate that blocks the first access way from receiving the stab of the motor control center unit, the first gate being configured to slide into an open position of the first gate to receive the stab when the motor control center unit is inserted into the motor control center section;

a second shroud mounted on the back wall of the motor control center unit, the second shroud being aligned with the first shroud, the second shroud surrounding a second access way for passing the respective one of the stabs of the motor control center unit toward the electrical power bus; and a second gate slideably mounted on the second shroud, the second gate being biased to a closed position of the second gate that blocks the second access way from passing the respective one of the stabs of the motor control center unit toward the electrical power bus, the second gate being configured to slide into an open position of the second gate to allow passage of the respective one of the stabs when the respective one of the stabs is advanced toward the electrical power bus, the first access way of the first shroud and the second access way of the second shroud forming a protective tunnel when the first gate and the second gate are open.

13. The motor control center unit of claim 12:
wherein the second shroud is aligned with a corresponding one of the apertures in the back wall of the housing, the corresponding one of the apertures being where the respective one of the stabs passes through on its way to contact the electrical power bus; the motor control center unit further comprising: a flexible, insulating sheath located within the housing, the flexible, insulating sheath surrounding the respective one of the stabs and having one end fastened to an inward-face of the back wall of the housing, the flexible, insulating sheath being aligned with the corresponding one of the apertures in the back wall of the housing; the flexible, insulating sheath, in combination with the first and second shrouds, forming the protective tunnel.

14. The motor control center unit of claim 13:
wherein the protective tunnel is formed by the flexible, insulating sheath, in combination with the first and second shrouds, the protective tunnel configured to protect the respective one of the stabs from contacting loose, conductive material during travel of the protective tunnel from a retracted position to an advanced position to connect with the electrical power bus.

15. The motor control center unit of claim 12:
wherein the first shroud is unitary and comprised of a plurality of first shroud units, each of which is fastened to a respective one of a plurality of bus bars in the electrical power bus, the plurality of first shroud units being joined by an insulating web to form the unitary first shroud.

16. The motor control center unit of claim 12:
wherein the second shroud is unitary and comprised of a plurality of second shroud units, each of which is aligned with a corresponding one of the apertures in the back wall of the housing, the corresponding one of the apertures being where the respective one of the stabs passes through on its way to contact a respective bus bar of the electrical power bus, the plurality of second shroud units being joined by an insulating web to form the unitary second shroud.

17. The motor control center unit of claim 12:
wherein the second shroud is comprised of a plurality of second shroud units;
a plurality of flexible, insulating sheaths located within the housing, each of which surrounds a respective one of the plurality of stabs, each of the plurality of flexible, insulating sheaths having one end fastened to an inward-face of the back wall of the housing, each of the plurality of flexible, insulating sheaths being aligned with a corresponding one of the apertures in the back wall of the housing, each of the plurality of flexible, insulating sheaths in combination with a respective one of the plurality of second shroud units and the first shroud, forming the protective tunnel.

* * * * *